Oct. 12, 1937. G. M. DARBY 2,095,923
COMBINED FLOCCULATION AND SEDIMENTATION APPARATUS
Filed June 8, 1935 3 Sheets-Sheet 1

INVENTOR.
GEORGE M. DARBY
BY
Arthur Middleton
ATTORNEY.

Oct. 12, 1937.     G. M. DARBY     2,095,923
COMBINED FLOCCULATION AND SEDIMENTATION APPARATUS
Filed June 8, 1935     3 Sheets-Sheet 2

INVENTOR.
GEORGE M. DARBY
BY
ATTORNEY.

Oct. 12, 1937.  G. M. DARBY  2,095,923
COMBINED FLOCCULATION AND SEDIMENTATION APPARATUS
Filed June 8, 1935   3 Sheets-Sheet 3

INVENTOR.
GEORGE M. DARBY
BY
Arthur Middleton
ATTORNEY.

Patented Oct. 12, 1937

2,095,923

REISSUED

UNITED STATES PATENT OFFICE 2,095,923

COMBINED FLOCCULATION AND SEDIMENTATION APPARATUS

George M. Darby, Westport, Conn., assignor to The Dorr Company, Inc., New York, N. Y., a corporation of Delaware Application June 8, 1935, Serial No. 25,568

7 Claims. (Cl. 210—55)

This invention relates to an apparatus for the clarification of liquids containing solid matter held in suspension therein and more particularly to the clarification of relatively dilute suspensions of very fine particles wherein the particles must undergo a process of flocculation or agglomeration before they are economically removable by sedimentation.

It has been found that in the treatment of most dilute liquid suspensions for removal of the suspended solid matters, flocculation of the solids is of paramount importance. This condition is especially true of some of the most important applications of sedimentation such as sewage treatment, clarification of turbid river waters, water softening, etc. Heretofore sedimentation basins have been dimensioned so as to provide within the sedimentation chamber and during the sedimentation operation a sufficient volume and detention to permit the removal of the very finest solids. It has been the prevailing view of those skilled in the art that such volumes or detention are necessary factors in the removal of solids by sedimentation. It has been found that the sedimentation of a particle of fixed diameter and settling characteristics is almost entirely a function of the area of the sedimenting body or basin. On the other hand the turbidity of most turbid waters is composed of particles of such extremely fine size and exhibiting such slow settling ability that economical removal of the matter by sedimentation would be impossible unless another factor were not existent. This is the phenomenon known as flocculation.

Flocculation is the property, exhibited by colloids and most fine suspensions, of aggregating or gathering together to form much larger bodies or flocs. A more or less commonly accepted theory of the mechanism of the flocculation reaction assumes that colloidal or semi-colloidal solids are kept in suspension by an electric charge carried by the particles and that since this charge is similar on all particles they repel each other and remain dispersed throughout the liquid medium in more or less permanent suspension. In order to destroy this condition it is necessary to neutralize the charge on the particles by the addition of an electrolyte or a colloid of opposite charge. The particles preferentially adsorb either positive or negative ions from dissociation of the dissolved salts. After neutralization of the charge the particles are then free to adhere or coalesce due to the natural attraction of similar bodies. Most commercial suspensions already contain sufficient electrolyte although the resultant intensity of flocculation may vary considerably. In the case of thick pulps and slurries such as encountered in the metallurgical and chemical industries, flocculation is very rapid and a matter of seconds or minutes. In the case of very dilute suspensions, especially those like sewage and like the aluminum hydrate resulting from dosage of water, the time required to reach a degree of flocculation for permitting or aiding sedimentation is of the order of five minutes to three hours or even more.

It has been found that the rate of flocculation is affected to a remarkable degree by the extent to which particles are mechanically brought together, in other words by the degree of agitation, and by the amount of contacting and type thereof resulting from the agitation, or as otherwise expressed by the number of impacts of particles with each other, of floc forming sections with other floc forming sections and/or of particles with floc sections. A degree of flocculation which would take, for instance, under conditions of quiescence, two hours to be reached—such as would exist in the usual sedimentation apparatus—can be accelerated to the extent that the same degree of flocculation may be obtained in five to ten minutes in or by the use of a properly designed mechanical flocculating means. As a matter of fact, removal of finest particles or, as one might say, complete or a greater degree of flocculation that is not possible with almost infinite detention under non-agitated conditions, can be obtained with mechanical agitation.

It is therefore obvious that mechanical flocculation preceding sedimentation is a very desirable combination and in many cases an essential part of the process. In a sedimentation process or apparatus agitation is obviously highly objectionable in that the slightest turbulence will prevent the desired settling of the suspended particles. The answer would appear therefore to be the division of the operation into two entirely separate stages. This two—entirely separate—stage treatment is now general, or at least quite common, practice in the case of water treatment. In some cases as, for instance, in the treatment of sewage this separate flocculation treatment—is too expensive and cumbersome. Furthermore it is all but impossible to move a fluid containing the delicate and fragile flocs without causing some damage to the flocs. In other words, it is difficult to convey the particles from the flocculation apparatus to the sedimentation zone without disintegrating some of the flocs. In fact, it is pointed out that the more violent and sharp the changes in flow direction of the liquid containing the flocs and the more rough the handling of the floc masses, the greater is the detrimental effect upon or disintegration of the flocs or floc structures.

The invention revolves about a novel combined flocculation and sedimentation apparatus; according to which a substantial flocculation of a solid-liquid mixture is carried out during flow of the solid-liquid mixture through the flocculating means; according to which the flocculating means is arranged in respect to the sedimentation basin so that at least an operative portion of the flocculating means is located within or extends into the sedimentation basin and particularly within or into the peripheral confines of the sedimentation zone thereof; and according to which the operative portion of the flocculating means which is within or extends into the sedimentation basin is located above and in vertical spaced relationship with respect to the settling area or bottom of the sedimentation basin and has a relatively unobstructed submerged discharge section leading therefrom thereby providing a constant hydraulic communication by which there is a gentle and free flow or drift by gravity of flocculated liquid from the flocculating means or section directly into the body of liquid undergoing sedimentation; and according to which the combined resultant flow of liquid through the flocculation and sedimentation basin is horizontal; the general level of the liquid within the flocculating means or section being substantially that for the liquid within the sedimentation zone except of the slight differential head incident to the gravity flow from the flocculating means or section into the sedimentation zone; said discharge from the flocculating means or section being at a location over and above the settling area or bottom of the sedimentation basin and also at a location sufficiently spaced from the effluent launder construction with which the sedimentation basin is provided to permit of a consequent substantial sedimentation of the flocculated liquid thus relatively unobstructedly delivered from the flocculating means or section into the body of liquid undergoing sedimentation.

A main object of this invention is to provide a combined flocculation and sedimentation unit—a unitary arrangement—wherein the efficiency of the combination is better than that of either one alone. In particular it is proposed to place the flocculating unit in effect immediately and wholly within an upper section of the sedimentation chamber so that a part of the volume of the sedimentation chamber is utilized without detrimentally affecting or reducing the available settling or sedimentation zone and therefore the settling capacity of the unit.

A further object is to so arrange the flocculating or flocculation compartment so that the discharge therefrom, namely, the flocculating feed, is introduced directly into the sedimentation chamber at an optimum point for efficient sedimentation.

A still further object is to provide an arrangement that permits a relatively free, easy, gentle and unobstructed direct flow or drift from the flocculating compartment or zone into the sedimentation compartment or zone and in a manner whereby breakage or damage to the flocs in passing from the flocculation zone to the sedimentation zone is largely or wholly prevented.

The invention possesses other objects and features of advantage, some of which with the foregoing will be set forth in the following description. In the following description and in the claims, parts will be identified by specific means for convenience, but they are intended to be as generic in their application to similar parts as the art will permit. In the accompanying drawings there have been illustrated the best embodiments of the invention known to me, but such embodiments are to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings.

The means and arrangement by which the objects hereof are accomplished and realized will be made clear by a study and consideration of the accompanying drawings which constitute a part of this specification. In said drawings:—

Figs. 1, 2 and 3 illustrate one form or arrangement of apparatus incorporating features herein outlined as important or essential; Fig. 1 being a plan view partially broken away; Fig. 2 being a vertical sectional view taken as on the vertically extending plane indicated by the line 2—2 of Fig. 1 looking in the direction of the arrows; and Fig. 3 being a sectional view of a detail or portion of the apparatus taken as on the vertically extending plane indicated by the line 3—3 of Figs. 1 and 2 looking in the direction of the arrows.

Fig. 4 being a plan view, and Fig. 5 being a vertical sectional view taken as on the vertically extending plane indicated by the line 5—5 of Fig. 4 looking in the direction of the arrows.

Fig. 6 being a plan view, and Fig. 7 being a vertical sectional view taken as on the vertically extending plane indicated by the line 7—7 of Fig. 6 looking in the direction of the arrows.

Figure 1:
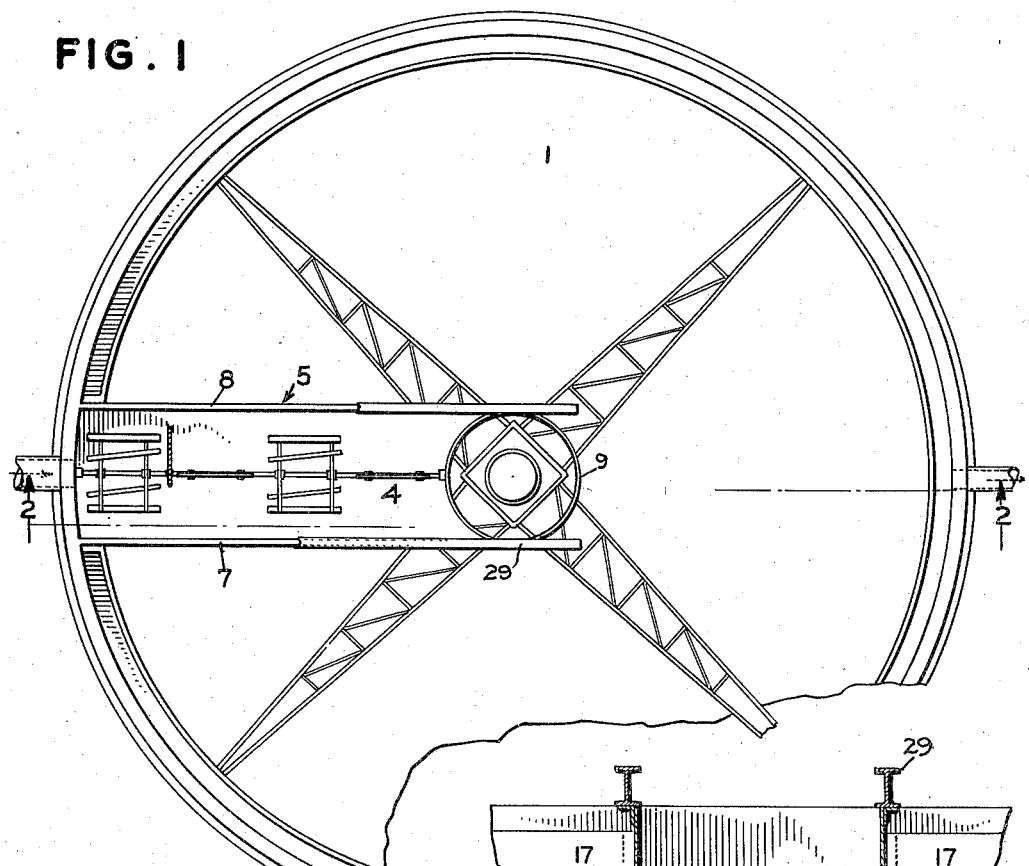

Reference will now be made to the drawings in detail. Wherever employed the same reference character designates like or equivalent functioning parts even though in the different arrangements illustrated certain of the parts thus designated by a reference common thereto may be of different forms or embodiments thereof.

Figure 3:
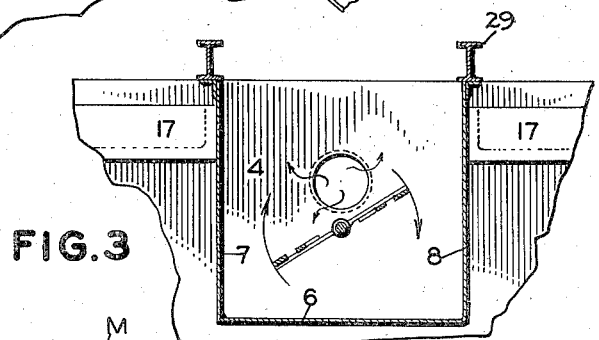
Figure 2:
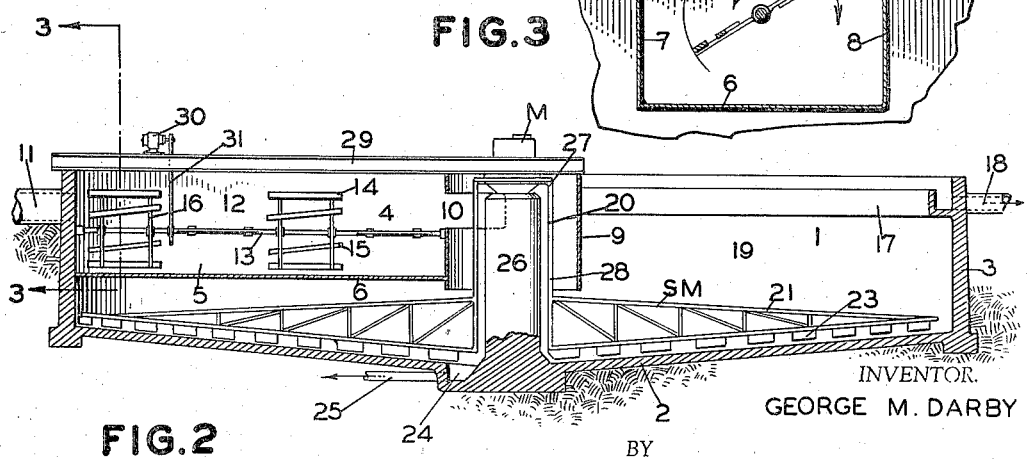

The apparatus of Figs. 1, 2 and 3 includes a sedimentation tank or basin 1 having a slightly inverted conical bottom 2 from which there upwardly extends a cylindrical peripheral or boundary wall 3. It is to be noted, however, that in the realizing of the invention it is not necessary that the boundary wall be cylindrical, as other forms of tank construction can be employed.

Part of this sedimentation tank or basin is partitioned off as or so as to provide a flocculation space or zone 4. This partition is obtained by the employment of a trough construction 5 having a bottom 6 and upwardly extending side walls 7 and 8 within which there is provided the flocculation zone or space 4 which may be referred to as a flocculation or flocculating compartment.

The trough 5 essentially providing the compartment, extends to and in effect terminates in a centrally located cylindrical section or member 9—sometimes referred to as the feedwell— open at the bottom and having a relatively large unobstructed opening 10 that provides a relatively unobstructed discharge opening, passageway or section leading from the flocculation compartment 4 on the one hand to the interior of the cylindrical section 9 on the other hand. From another point of view, the structural arrangement of the parts which provides this discharge opening 10 and the central feedwell construction may be considered as defining a discharge section or portion of or for the trough construction whereby a relatively ready, easy and unobstructed flow of liquid containing flocs in suspension therein can pass directly from the flocculating means, zone or section to and into the sedimenting zone, space or section 19 of the sedimentation basin or tank 1.

The members constituting the trough 5 may be viewed as providing a flocculation chamber structure which is partially submerged, and is located in a manner whereby the bottom or bottom member 6 thereof directly overlies a section of the bottom of the tank. This bottom 6 occupies a vertically spaced position in respect to the bottom section overlain thereby and it is also positioned substantially below the level of the body of liquid undergoing sedimentation, to wit; the normal level of the liquid as determined by the effluent launder 17 hereinafter referred to. The upwardly extending side walls 7 and 8 of the trough or flocculation chamber structure extend from the bottom 6 upwardly in a manner whereby the upper edge portions thereof are above the normal level of the liquid undergoing sedimentation.

It will be noted that a flocculation zone is provided which is functionally distinct and separate from the sedimentation zone except through the medium of a definite discharge or discharge section whereby hydraulic communication continually exists between the flocculation zone and the sedimentation zone thereby permitting not only easy and ready drift and free flow from the flocculation zone into the sedimentation zone but also insuring the maintenance of a common level for and as between liquid in each and which may be considered in effect as extending from one zone to the other.

The arrangement of the flocculation chamber structure in respect to the sedimentation tank structure is also such as to readily permit sedimentation to take place below the flocculation chamber structure as well as in the space around or about it. Moreover, the vertically spaced relationship of the bottom member 6 above the corresponding section of the tank bottom directly below it permits the passage and movement of arms of the raking structure whereby the underlying sections of the tank bottom as well as the other section of the tank bottom can be properly raked for the removal of the sedimented material.

A pipe or conduit 11 serves as an influent supply or feeding means by which a chemically dosed liquid containing solids in suspension therein, to wit, a liquid-solids mixture such as sewage, is passed into the flocculating means or section of the apparatus, namely, into the flocculation compartment or zone 4. In this compartment 4 there is means, broadly designated as 12, for effecting a gentle but positive agitation of the liquid-solids mixture as it flows along the trough on its passage from the receiving section thereof as defined by the influent feed 11 on the one hand, to the discharge portion or section thereof as defined by the discharge opening 10 on the other hand.

The agitating means 12 just referred to is satisfactorily provided by the horizontally and radially extending shaft 13 from and by which there are carried paddles as 14 and 15 through the medium of the arms or arm constructions 16 which are directly mounted on the shaft.

The sedimentation tank or basin 1 has an effluent outlet provided by a peripherally extending launder trough 17 and an outflow or effluent launder pipe or conduit 18. The trough 17 is located at the upper interior portion of the tank and defines the normal upper level for the liquid-solids mixture within the tank, as is usual in connection with the operation of sedimentation basins. It will be noted that the level of the liquid-solids mixture in the flocculating zone or compartment 4 and that of the liquid-solids mixture in the sedimentation zone or compartment 19, are practically the same—being exactly the same except for the slight differential in head incident to the free flow of liquid from the influent or feed pipe 11 through the flocculating zone or compartment 4, the unobstructed discharge opening 10, the interior of the open bottom cylindrical section 9 through the sedimentation compartment 19 to and into the trough of the effluent launder 17.

It will also be noted that the shaft 13 is substantially submerged to a sufficient depth whereby the paddles 14 as they are rotated practically remain in continuous submergence.

It will further be noted, as previously indicated, that the liquid-solids mixture after being subjected to the flocculation operation in the compartment 4 has an easy, quiet and gentle flow therefrom and, in effect, directly into the sedimentation zone or compartment 19; also that immediately upon the liquid containing the flocculated material in suspension therein passing the lowermost edges of the feedwell 9 there is a flow in an easy manner and at a gradually decreasing rate towards the effluent launder 17 until the supernatant leaves as a relatively clear effluent. The delivery of the liquid-solids mixture from the lower portion of the cylindrical section 9 is, however, above the lowermost interior section of the sedimentation tank, the lower portions of which sedimentation tank or basin are traversed by a sludge collecting and transferring mechanism broadly designated SM and which includes a rotatable central structure or arm carrying section 20, arms 21 radially extending therefrom, and raking blades or scrapers 23 in turn carried by the arms.

This sludge collecting and scraping mechanism preferably but not necessarily embodies the essential features and mode of operation of what is known as the Dorr type of sludge raking and scraping mechanism, and functions to rake and collect settled solids such as sewage sludge from diverse sections of the bottom or sedimenting area of the sedimentation tank or basin 1 to and into a centrally located sump hopper or sludge discharge section 24 from which the solids thus conveyed thereto are ultimately hydraulically withdrawn or passed through and by the means of the sludge withdrawal conduit or pipe 25.

In the construction shown, a centrally located pier is indicated at 26. Thereupon there is rotatably mounted a carrying ring or annular rotatable frame member 27 from which and by which there is carried a depending structure 28, and from the latter of which there are carried the arms 21 heretofore referred to. The parts 27 and 28 are essential elements of the rotatable carrying structure heretofore described and referred to as part 20.

The sludge scraping mechanism SM is caused to rotate in any suitable manner as through the medium of a motor M carried by the central pier 26 and suitable speed reducing mechanism, not shown, between the motor M on the one hand and the rotatable frame member or carrying ring 27 on the other hand whereby, incident to the operating of the motor the sludge raking mechanism can be caused to rotate. It will be here noted that the sludge rakes or blades 23 are inclined or angularly disposed in respect to their path of travel in such a manner that incident to the rotating of the sludge raking mechanism SM about its vertical axis there follows a progressive forward and inward impelling or ploughing of the sedimented solids until they are ultimately passed to and into the sludge receiving hopper or sump 24. From and by means of the central pier 26 there are carried the inner end portions of a beam or framework construction 29, the outer end portion of which is supported on and by the upstanding peripheral wall 3 of the tank. It is feasible to utilize this beam construction 29 as part of the means for affording support to the motor M and the speed reducing gearing heretofore referred to.

A motor 30 is carried by this beam or framework construction 29 and, through the medium of a gear and chain construction 31, serves to drive the paddle carrying shaft 13. It is to be noted that a sufficient speed reduction is necessary between the motor 30 on the one hand and the shaft 13 on the other hand, so that only a slow movement will be imparted to the paddles 14 and 15 whereby only a gentle agitative effect will be imparted by the paddles to and upon the liquid-solids mixture being subjected to flocculation while flowing through the flocculation zone or compartment 4.

Fig. 3 has been incorporated in order to more clearly bring out and show the relationship of the general level of the liquid undergoing flocculation in respect to the effluent launders of the sedimentation portion of the apparatus, and also to show the position of the flocculating paddles in respect to the liquid-solids mixture upon which they operate.

The beam construction 29 may be referred to as a truss or girder construction, and it serves to support the central cylindrical section or feedwell 9, and also the inner end of the trough construction 5 of which the cylindrical or feedwell 9 construction may be considered as constituting a part.

In operation the liquid to be clarified which has already had a chemical coagulant mixed therewith enters at 11, is subjected to gentle coagmenting agitation that is non-dispersive by the paddle mechanism that includes the shaft 13 and the paddles 14 and 15 while flowing through the flocculating zone or compartment 4. After a suitable detention within this flocculating zone or compartment 4, during which the desired degree of flocculation is obtained, the desired degree of floccoagmentation or floc building up and floc amassment into floc colonies, the liquid with the flocculated material suspended therein, gently flows or drifts through the relatively unobstructed discharge opening 10 into the centrally located cylindrical section or feedwell 9 which may function as a stilling and distributing well. Therefrom the liquid-solids mixture flows gently out of the bottom of the well and distributes itself over the entire area of the basin. The heavier solid particles settle to the bottom of the sedimentation chamber and from time to time they are swept, collected and transferred by the scrapers or blades 23 which are inclined to their forward path of movement in a manner to effect the ultimate transfer of the solids collected and transferred thereby to and into the discharge section or sump 24 from which they are hydraulically withdrawn through the medium of the pipe 25. The relatively clarified effluent, as previously pointed out, overflows into the launder 17 and thence through the conduit 18 from the apparatus.

The apparatus of Figs. 4 and 5 embodies substantially the essential features above described in connection with the arrangement of Figs. 1, 2 and 3, but in the arrangement of Figs. 4 and 5 a slight change has been embodied in the flocculator construction.

According to this latter arrangement, there is employed a series of shafts 32, 33 and 34. These shafts are substantially submerged. They extend horizontally and at right angles to a radial line or, in other words, at right angles to the general flow path for the liquid-solids mixture undergoing flocculation. These shafts, through the medium of a suitable arm construction as 35, carry flocculation paddles 36, all of which rotate in the same general direction. A motor 38, through the medium of suitable speed reducing sprocket and chain gearing broadly designated as 39, serves to operate the paddles which will be an aid because of the gentle agitative effect thereof in furthering the flocculation operation carried out on the liquid-solids mixture as it flows from the influent feed 11 ultimately through the unobstructed discharge opening 10, thence into and from the distributing or feedwell 9.

Figure 4:
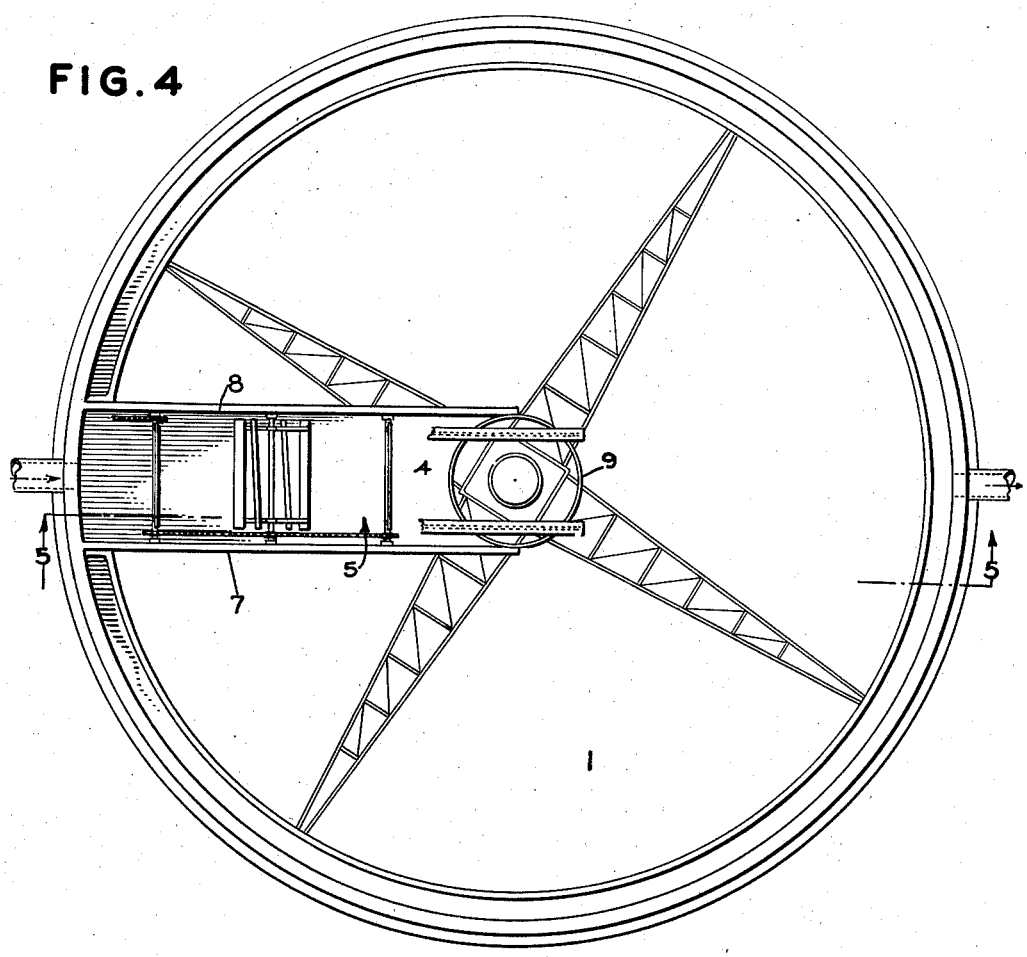
Figs. 4 and 5 illustrate another form or arrangement of apparatus incorporating features described herein as important or essential.
Figure 5:
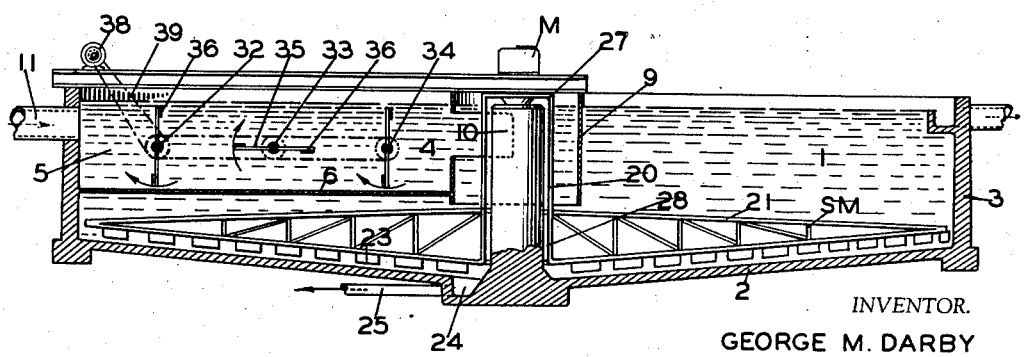

Otherwise as indicated, the apparatus of Figs. 4 and 5 functions exactly as the apparatus of Figs. 1, 2 and 3.

Figure 6:
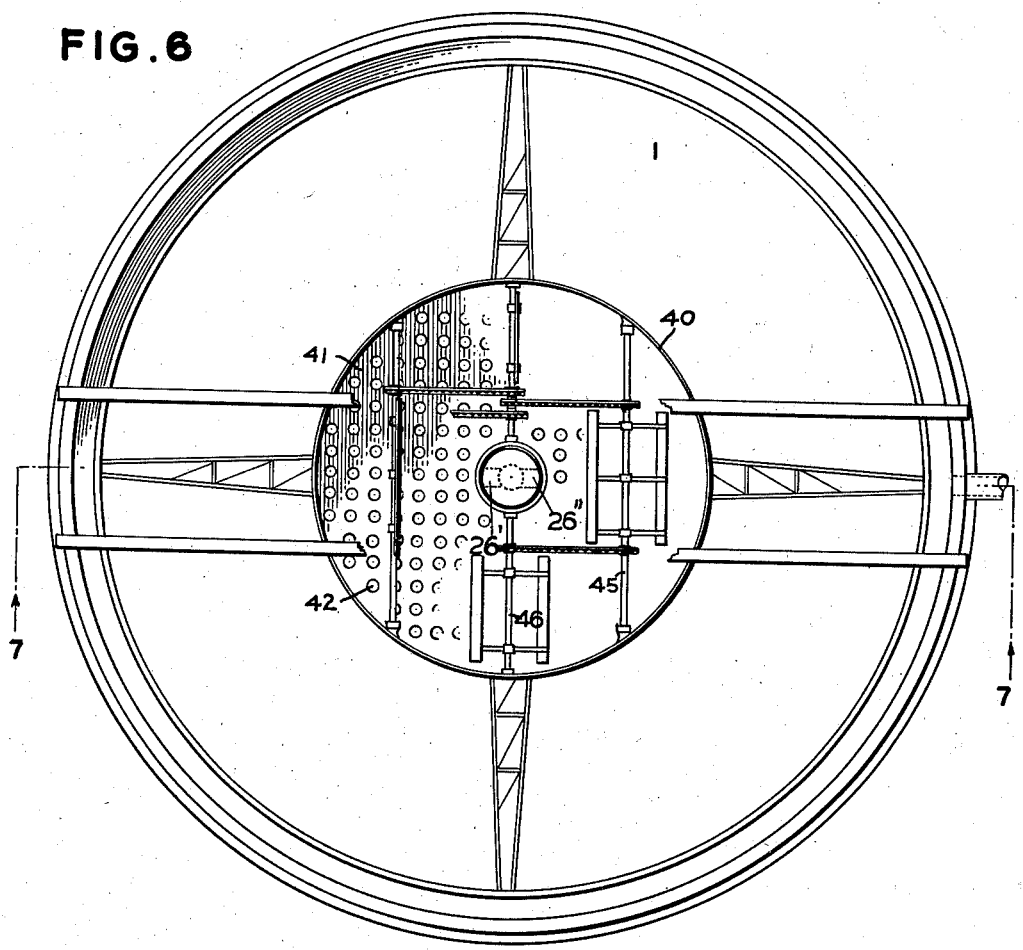
Figs. 6 and 7 illustrate still another form or arrangement of apparatus incorporating features described herein as important or essential.
Figure 7:
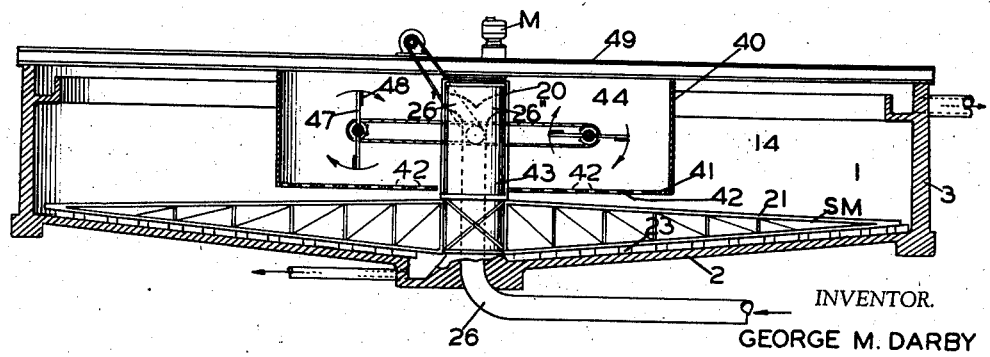

The apparatus of Figs. 6 and 7 indicates a still further variation or arrangement that embodies certain essential features of the invention.

According to this arrangement, the flocculating compartment and the centrally located feedwell are identical, and are provided within and by a cylindrical centrally located drum or shell 40 having a bottom 41 with a large number of openings or discharge sections 42. The centrally located drum or shell 40 and the bottom 41 provided a flocculating chamber therein and may be referred to as a partially submerged flocculation chamber structure the marginal wall 40 of which extends upwardly a short distance above the normal level of the liquid within the sedimentation tank as determined by the effluent launder thereof. The bottom 41 of this structure directly overlies to a substantial extent a section of the sedimentation tank bottom 2, it is vertically spaced from and above the section of the tank bottom overlain thereby whereby the necessary space is provided within, along or through which the rake carrying arms of the settled solids raking mechanism can travel and function. This bottom 41 of the flocculation chamber structure is substantially below the normal or general level of the liquid within the sedimentation tank with the result that a desired flocculation compartment having substantial extent within the sedimentation tank is realized. The openings 42 in the bottom 41 collectively provide the necessary and desired hydraulic communication or submerged discharge between the flocculation zone and the sedimentation zone whereby the desired free flow and drift of liquid with flocculated material suspended therein can pass from the flocculation zone into the sedimentation zone and whereby the normal or general level of the liquid in said zones is substantially the same because of said bodies of liquid in effect constituting a single body of liquid even though the flocculation zone and the sedimentation zone are effectively functionally separated. The sedimentation tank or basin 1 has a centrally located pier 43 that extends upwardly from the bottom 2 thereof. This upwardly extending pier section 43 has rotatably mounted at the upper portion thereof the rotatable carrying structure 20 from and by which there are carried the arms 21 of the sludge raking mechanism SM whereby, when said sludge raking mechanism is caused to rotate by the motor M, there can be effected the collecting and transferring of settled solids in the manner previously described in connection with the other arrangements.

This centrally located pier 43 is hollow and provides therein the upwardly extending terminal arm of an inverted siphon feed construction, the terminus of which has branches 26' and 26" by which the incoming feed is delivered into a flocculation space or zone that is provided within the cylindrical section or shell 40 and above the perforated floor or bottom 41. The flocculating space or zone just referred to is designated as 44.

Within this flocculating zone or space there are also located submerged horizontally extending paddle carrying shafts 45 and 46 which are parallel to each other. Each of these shafts supports arm constructions such as 47 that carry paddles 48.

An inspection of these figures will make it clear that the incoming liquid-solids mixture as fed by or delivered from the conduit sections 26' and 26" will naturally spread throughout the entire section of the flocculating compartment 44, and that the paddles will effect a relatively efficient but gentle agitation of the entire body of solids-liquid mixture therein. After a due period of detention there is a relatively easy, quiet and gentle flow of the liquid containing flocculated solids through the numerous openings of the bottom plate or member 41 in a manner whereby the liquid-solids mixture thus delivered will take flow paths substantially after the order of the flow paths heretofore described in connection with the arrangements of the preceding figures.

The centrally located section or feedwell shell 40 has been described as being cylindrical. It is to be noted, however, that this may be even square or of an intermediate shape such as hexagonal. It is also feasible to leave the entire bottom of this central well open if one desired to do so, as there will take place efficient flocculation incident to the mode of feed and the paddle operation described.

The cylindrical section or feedwell 40 is supported in any suitable manner as by the beam or truss construction broadly designated by 49 and which derives support from the boundary walls of the sedimentation unit, which may also derive support if desired from the central pier construction.

In all of the arrangements described it is to be noted that there is in fact a flocculation trough or flocculation chamber structure wherein the normal level of the liquid-solids mixture undergoing flocculation is substantially that of the liquid-solids mixture undergoing sedimentation within the larger sedimentation area; that this flocculation space is located within or at least extends within the sedimentation zone or area as defined by the peripheral or boundary walls of the sedimentation tank or basin; that each of the flocculation troughs or chambers has a bottom or delivery section which is substantially below the normal level of the body of liquid undergoing sedimentation as defined and determined by the effluent launder construction; and that the lowermost area or edge of the discharge portion or of the discharge openings of the flocculation apparatus—while substantially below the level as determined by the effluent launder—is somewhat above the area or zone wherein the scraping of the sedimented solids is effected by and because of the functioning of the scrapers or blades 23, which may be referred to and are referred to as the essential scraping elements of the scraping mechanism SM. It will also be noted that in the constructions as shown, portions of the raking mechanism extend under and operate in the space that is located under certain portions of the flocculator construction.

The portions of the apparatus constituting what may be referred to as a flocculation trough or flocculation chamber structure may be viewed as a part of the influent supply means by which the liquid solids mixture to be subjected to sedimentation is introduced and ultimately delivered into the sedimentation zone of the sedimentation tank.

It has been briefly mentioned before that sedimentation is a function almost entirely of area. By available settling area is meant the maximum horizontal cross-section of the sedimenting fluid body. In this proposed device the fact that part of the volume of the tank or basin is set aside for flocculation and feed distributing purposes does not reduce or affect in any way the available settling area and therefore the strictly sedimentation capacity of the unit. All of the cross-sectional area of the basin is still available and will be utilized for settling. As was pointed out before, the volume and therefore the depth of the sedimentation device is of no appreciable importance provided the feed is already properly flocculated.

By the arrangements indicated in this invention, part of the otherwise useless volume or depth of the tank is set aside for flocculation purposes and provided with mechanical agitating means which greatly accelerate the processes of flocculation. In other words, the volume of the sedimentation basin which would normally be used merely for flocculation purposes under quiescent conditions is converted to use for flocculation under induced and accelerated mechanical conditions. It therefore follows that the flocculating efficiency of the flocculating compartment is just as great as it would be if it were a separate unit, and the sedimentation efficiency and incidental flocculating efficiency of the complete basin is just as great as or greater than it would be if part of it were not so utilized. The result is that a combination unit is obtained having maximum flocculation and sedimentation efficiency.

By locating the flocculating device immediately within the sedimentation zone, the flocs move or flow from one zone into the other without any appreciable restriction or change in velocity and therefore are not subject to disruptive forces. This is a very important feature of this device as it is my experience that almost all other possible combinations of flocculating means or units and sedimentation units cause objectionable restriction, changes of velocity, and changes in direction of flow which are detrimental to the floc structure.

It may also be noted that the specific arrangements indicated provide for the introduction of the flocculated feed at the point or location providing the optimum sedimentation conditions. By this is meant that the feed is introduced near the bottom of the basin and at a point remote and equi-distant from the point or points of effluent discharge. Also that the feed is introduced quietly and is efficiently distributed.

According to the broadest aspects of the invention, it is directed to an associated flocculation and sedimentation apparatus constituting a unit in which the level of the liquid within the flocculator is substantially the level of the liquid within the sedimentation unit and in which the flocculating unit has a discharge section which provides a relatively free, easy and unobstructed flow of liquid which has undergone flocculation treatment and which has flocculated material suspended therein from the flocculation zone into the sedimentation zone and in a manner to avoid any substantial disrupting or breaking down of the formed flocs which have resulted from the carrying out of the flocculation operation therein.

According to the specific embodiments of the invention as shown, and also according to the preferred embodiments thereof, the flocculating means is arranged with respect to the sedimentation basin so that an operative portion of the flocculating means is located within or extends substantially into the sedimentation basin. However, according to the very broadest aspects of the invention, there is contemplated the possible employment of a flocculating means which is arranged with respect to the sedimentation basin so that the functioning effects of the flocculating means and of the sedimentation basin constitute that of a single unit; and according to an arrangement such as that just referred to, the flocculating means does not necessarily extend into the sedimentation basin but it does necessarily open or empty directly into such basin, whereby the advantageous effects of the combined parts enables a ready and efficient carrying out of a flocculation operation within the flocculating portion or section of the unit and a direct discharge of the flocculated liquid mixture into the sedimentation zone or section of the unit in an easy gentle manner that avoids disruption of the formed flocs to any substantial extent.

What is claimed is:

1. An apparatus for performing flocculation and sedimentation operations; which apparatus comprises, in combination, an open top sedimentation tank having a bottom with boundary walls extending upwardly therefrom and having a settled solids discharge section leading from the lower interior portion thereof; an influent supply means including a partially submerged flocculation chamber structure wherein liquid having flocculatable solid material therein is received and from which the liquid with flocculated material suspended therein is ultimately delivered into the sedimentation zone of the tank; mechanically actuated paddles operable within the flocculation chamber structure for imparting to the liquid therein gentle, but positive, agitative effects conducive to floc coagmentation and amassment; an effluent launder for withdrawing supernatant liquid from the upper portion of a body of liquid undergoing sedimentation within the sedimentation zone and providing a means that determines the normal surface level of said body of liquid; and means operable over the bottom of the tank for mechanically impelling sedimented material to said settled solids discharge section; said flocculation chamber structure providing a flocculation section having substantial extent within the confines of the tank, occupying only a minor section of the upper surface portion of the body of liquor undergoing sedimentation, providing a floor portion immediately below the mechanically actuated paddles, but vertically spaced from the tank bottom, wherein there is realized the positive mechanical agitative effect of the paddles, and having discharge area providing constant hydraulic communication between the liquid undergoing flocculation in the flocculation chamber structure on the one hand and the body of liquid undergoing sedimentation within the sedimentation zone on the other hand whereby the level of the liquid undergoing flocculation is at all times substantially that of the level of the liquid undergoing sedimentation and whereby the liquid when flocculated within the chamber structure together with the flocculated material suspended therein can flow and drift freely, quietly and gently from said chamber structure through said discharge area and ultimately into the sedimentation zone.

2. An apparatus as defined in and by claim 1 according to which the mechanically actuated paddles are realized by mechanical agitators comprising two or more rotatable parallel horizontally-extending submerged shafts having horizontally extending paddles supported thereby and radially spaced therefrom and operable to substantially, horizontally, countercurrently and unobstructedly circulate a supply of previously formed flocs and throughout the liquid undergoing flocculation in the flocculation zone of the partially submerged flocculation chamber structure and in the region immediately over the floor defining portion of the flocculation chamber structure.

3. An apparatus as defined in and by claim 1 according to which mechanically actuated paddles operable in the partially submerged flocculation structure are provided by a mechanical agitator comprising a horizontally extending shaft having horizontally extending paddles supported thereby and radially spaced therefrom and operable in a flocculation section directly overlying a section of the bottom of the sedimentation tank but separated therefrom by an intermediate structural section constituting a floor portion of the flocculation section, also according to which the means operable over the bottom of the tank for mechanically impelling sedimented material to the settled solids discharge section of the tank comprises a rake carrying arm turnable about a vertically extending axis and movable through the space intermediate the underside of the bottom portion of the submerged flocculation chamber structure on the one hand and a corresponding underlying section of the bottom of the sedimentation tank on the other hand.

4. An apparatus as defined in and by claim 1 according to which the liquid with flocculated material suspended therein is delivered by, along, through, and from a horizontally extending trough portion of the submerged flocculation chamber structure into the central portion of the sedimentation zone of the sedimentation tank.

5. An apparatus as defined in and by claim 1 according to which the bottom of the partially submerged flocculation chamber structure is provided with a grid-like distributing floor having a plurality of discharge openings collectively constituting a discharge area downwardly through which liquid with flocculated material suspended therein passes into the central portion of the sedimentation zone of the sedimentation tank.

6. An apparatus for performing flocculation and sedimentation operations which apparatus comprises, in combination, a sedimentation tank having a bottom with boundary walls extending upwardly therefrom, and having a settled solids discharge section; an influent supply means including as part thereof a horizontally extending flocculation trough which is normally partially submerged in the body of liquid undergoing sedimentation in the sedimentation zone of the tank, within which flocculation trough liquid with flocculatable material therein is received and horizontally along which said liquid flows preparatory to delivery of the liquid after flocculation into the sedimentation zone; mechanically actuated paddles operable within the trough for imparting to the liquid therein gentle, but positive, agitative effects conducive to floc coagmentation and amassment; an effluent launder for withdrawing supernatant liquid from the upper portion of the body of liquid undergoing sedimentation within the tank and providing a weir overflow that determines the normal level of the body of liquid in the sedimentation zone of the tank; and means operable over the bottom of the tank for mechanically impelling sedimented material to said solids discharge section; said flocculation trough having substantial extent within the area as marginally defined by the upstanding boundary wall of the tank but occupying within the sedimentation tank a space which is small as compared with that constituting the sedimentation zone within the tank, being constructed so as to provide a relatively horizontally extending passageway for liquid-solids mixture supplied therethrough, being defined as to a lower portion thereof by a submerged bottom member located directly over but in vertically spaced relationship in respect to a section of the tank bottom and at an elevation substantially below the level of the body of liquid undergoing sedimentation as determined by the effluent launder, providing a flocculation zone throughout which the functional effects of the mechanically actuated paddles extend, and having a discharge section providing constant hydraulic communication with the liquid undergoing flocculation operations within the flocculation zone on the one hand and the body of liquid undergoing sedimentation within the sedimentation zone on the other hand whereby the level of the liquid within the flocculation zone is substantially that of the level of the liquid undergoing sedimentation within the sedimentation zone and whereby the flocculated liquid and the flocculated material suspended therein flows and drifts freely, quietly and gently through said discharge section to and ultimately into the sedimentation zone.

7. An apparatus as defined in and by claim 6 according to which the partially submerged horizontally extending flocculation trough leads from the boundary wall of the sedimentation tank to a feedwell structure centrally disposed within the upper portion of the sedimentation tank, into which feedwell structure the liquid with flocculated solid material therein is received by horizontal flow from the flocculation trough and downwardly from which feedwell structure the liquid with flocculated material therein ultimately passes into the central section of the sedimentation zone within the sedimentation tank.

GEORGE M. DARBY.